United States Patent [19]
Shtayer et al.

[11] Patent Number: 5,717,858
[45] Date of Patent: Feb. 10, 1998

[54] METHOD AND STRUCTURE FOR PRIORITIZING PERFORMANCE MONITORING CELLS IN AN ASYNCHRONOUS TRANSFER MODE (ATM) SYSTEM

[75] Inventors: Ronen Shtayer, Tel-Aviv; Roni Eliyahu, Ramat-Gan; Aviel Livay, Holon, all of Israel

[73] Assignee: Motorola, Inc., Schaumburg, Ill.

[21] Appl. No.: 324,192

[22] Filed: Oct. 17, 1994

[51] Int. Cl.$^6$ .................................................. G06F 13/00
[52] U.S. Cl. ...................................... 395/200.11; 370/229
[58] Field of Search .......................... 395/200.11, 189.01; 370/94.1, 94.6, 17, 13, 60, 229

[56] References Cited

U.S. PATENT DOCUMENTS

| | | | |
|---|---|---|---|
| 5,257,311 | 10/1993 | Naito et al. | 370/94.1 |
| 5,313,453 | 5/1994 | Uchida et al. | 370/13 |
| 5,365,524 | 11/1994 | Hiller et al. | 370/60 |
| 5,440,565 | 8/1995 | Miyamoto et al. | 371/20.4 |
| 5,446,726 | 8/1995 | Rastoker et al. | 370/17 |
| 5,450,394 | 9/1995 | Gruber et al. | 370/17 |
| 5,515,363 | 5/1996 | Ben-Nun et al. | 370/17 |

OTHER PUBLICATIONS

C. Brazdziunas, "1Pag Support for ATM Services", Network Working Group, RFC 1680, Aug. 1994, pp. 1–7.

Ahmed et al, "Definitions of Managed Objects for ATM Management Version 8.0 using SMIv2", Network Working Group, RFC 1695, Aug. 1994, pp. 1–73.

*Primary Examiner*—Mehmet B. Geckil
*Attorney, Agent, or Firm*—Keith E. Witek

[57] ABSTRACT

A method (FIGS. 5–6) and a structure (FIGS. 3–4) are taught herein for prioritizing and transmitting forward monitoring cells (FMCs) for performance monitoring in an asynchronous transfer mode (ATM) system. An ATM system may have multiple physical lines which have many virtual paths which have multiple virtual connections. These paths/connections may be performance monitored by transmitting an FMC each time N ATM data cells are received for the connection/path (wherein N is number which may be different for each connection/path). The number of data cells are stored via a counter for each connection/path being monitored. Once N ATM cells are received on a given connection/path, an FMC descriptor is queued which indicates that the FMC cell for the given connection/path must be transmitted before receipt of N/2 subsequent cells received by the given connection/path. A priority (which is a function of one of the counters) is used to ensure that the N/2 requirement is satisfied.

22 Claims, 3 Drawing Sheets

METHOD AND STRUCTURE FOR PRIORITIZING PERFORMANCE MONITORING CELLS IN AN ASYNCHRONOUS TRANSFER MODE (ATM) SYSTEM

FIELD OF THE INVENTION

The present invention relates generally to data processing systems, and more particularly, to performance monitoring (PM) in an asyncronous transfer mode (ATM) system.

BACKGROUND OF THE INVENTION

In an asynchronous transfer system (ATM system), the ability to monitor performance is important. Typically, performance in monitored in an ATM system by transferring performance monitoring cells through an ATM connection. These cells, according to the ATM protocol, must be transmitting within a certain time frame. If these cells are not transmitted in a certain time frame, an error or fault will occur. Therefore, a method, data structure and apparatus are needed in order to timely and efficiently transmit performance monitoring cells throughout an ATM system.

Figure 1:
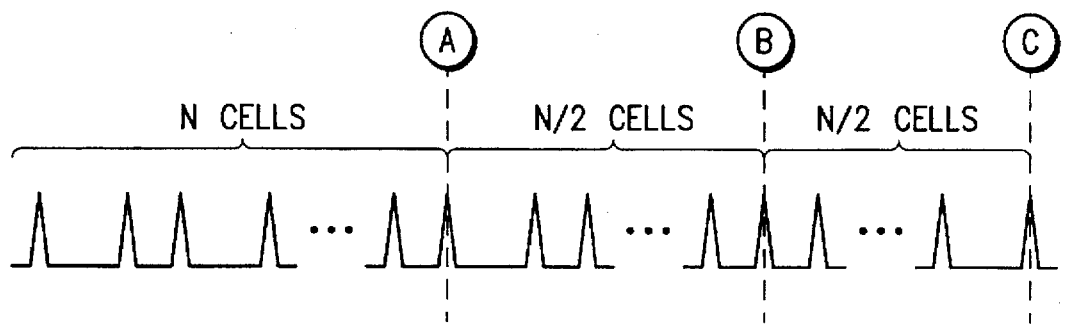
FIG. 1 illustrates, in a timing diagram, a receipt of ATM data cells by an ATM system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Taught herein is a performance monitoring pool system and method for an asynchronous transfer mode (ATM) system. This invention relates to a performance monitoring pool system for use in ATM cell processors. In an ATM system ATM data traffic is segmented into fixed size cells. Typically, an ATM data cell comprises four header bytes followed by a check redundancy code (CRC) byte followed by a 48-byte data payload. This results in an ATM data cell which is 53 bytes in length. ATM data cells belonging to different virtual connections or virtual paths are multiplexed on a single physical communication line. The ATM cell processor's role is to process cells going from the communication media to the ATM switch or from the ATM switch to the communication media.

One of the processing tasks performed by an ATM processor is to perform performance monitoring for some of the communication connections. During a performance monitoring, which is performed on a specific connection, one function of the ATM cell processor is to generate a forward monitoring cell (FMC) after receiving N USER cells belonging to that connection wherein N is a finite positive integer. In preferred cases, N can be either 1024, 512, 256, or 128 on each monitored connection although any number can be used. Typically, for ease of implementation, a power of two is chosen as N. This FMC is transmitted following either the receipt or sending of the N ATM data cells (i.e. USER cells) and the FMC contains performance monitoring information.

One way to ensure proper generation, transmission and receipt of the FMC it is to insert this FMC into the communication data stream on the physical line immediately after N ATM data cells are identified. The problem with this solution is that if multiple connections are generating FMCs at the same time, the incoming cell stream might not be transmitted until all FMCs are transmitted thereby stalling data transmission for an unusually long period of time. This stalling may add significantly to the delay between the time a cell is received and the time it is transmitted resulting in performance/quality loss. In many cases, large variance in delay is worst than a consistently long delay between transmissions and variance in delay may result which will also contribute to performance/quality loss. This method may also consume large cell buffers inside the ATM cell processor which is memory inefficient. Literally, millions of connections are possible in an ATM node and many of these connections could be performance monitored and require FMCs simultaneously or in such close proximity that the data communication would be slowed.

The solution taught herein is to first queue an identifier for all generated FMCs in a queue, priority structure, or like data structure having a priority. Since the ATM cell processor consumes and processes cells at a higher rate than the incoming cell arrival rate, there are holes in serial transmissions which the FMCs may be inserted into. Once again, to save queuing space, the only item that should be queued is an FMC descriptor/identifier instead of a full FMC which is typically several bytes long (standard ATM data cells are 53 bytes long).

After queuing the FMC, while waiting for its insertion to the outgoing cell stream, user cells belonging to that connection are still being received in the incoming cell stream. One of the rules of the ATM standard concerning performance monitoring is that the FMC should be inserted into the outgoing cell stream before N/2 subsequent user cells are received for its connection. For example, assume that N=100 for a connection which means that after the ATM processor receives 100 cells of that connection, an FMC identifier is queued and the ATM processor notes that the FMC needs to be transmitted. The ATM connection keeps receiving subsequent ATM data cells after the FMC identifier is queued. This subsequent receipt of data is allowed by the standard as long as the FMC corresponding to the queued FMC descriptor is sent before an N/2 subsequent cell is sent. Therefore, if N=100, after the FMC identifier is queued when the 100th ATM data cell is received via the connection, anywhere from zero to fifty cells (i.e., N/2 cells) may be received on that connection before the actual FMC is generated and transmitted on the line. If the more than N/2 subsequent ATM data cells are received before the FMC is transmitted on the connection, an ATM violation occurs. The ATM cell processor's goal is to minimize the probability of for such a violation.

A priority is needed since without the priority a problem arises. The problem with the queuing solution without priority is that an FMC belonging to a high bandwidth connection (high bandwidth meaning that more ATM data cells are transmitted in a given time period than compared to other connections) might be the last cell in a queue of a plurality of FMCs belonging to various connections/ channels waiting to be inserted in the outgoing cell flow thus increasing the probability for more than N/2 USER cells (i.e., ATM data cells) of its connection to be received which means an ATM performance monitoring (PM) violation occurred.

The solution to this starvation problem is to assign a higher priority to queued FMCs which are closer to violation or have a higher bandwidth. The FMC with the highest priority is inserted into the outgoing cell stream. If multiple cells have the same priority, one can be randomly chosen or chosen via a first-in-first-out (FIFO) criterion weighted by bandwidth so that starvation of a lower queued FMC descriptor does not occur.

The performance monitoring test already uses a variable named TUC (Total User Cell number) which is incremented each time a user cell is received by the ATM cell processor for this specific connection. For example if N=128, TUC=1 for a first ATM data cell, TUC=2 for a second ATM data cell, and so on until TUC=128 for a 128th ATM data cell. A counter starting from zero or another integer value which is intermittently reset or is continuously counting may by used to keep track of the TUC. When TUC modulu N is 0 (i.e. TUC=N) the ATM cell processor queues an FMC descriptor/ identifier for that connection. Each time a user ATM data cell is received, its connection priority for insertion into the cell stream is calculated according to TUC and N. By doing this weighted priority scheme using TUC and N, bandwidth is compensated for thereby ensuring that the cells closest to violation are handled first regardless of bandwidth.

One implementation is priority=(TUC modulu N/2) wherein if the priority increments to a high value and then wraps around to zero means violation. Therefore, the connections having higher fractional or numerical priority are the connections which are closer to violation since they are closer to wrapping around to zero. Note that when N is a power of 2—the modulu operation is performed by taking the Log(N) least significant bits of TUC. In order to save queuing space at a minimal or no cost to performance, one can queue the M most significant bits from the above calculated amount. For example, assume the TUC is an eight bit number and N=128. In this case, the TUC=00000000 for a first ATM data cell in the connection, TUC=01000000 after receipt of the N/2 ATM data cell (i.e. 64th ATM data cell), and TUC=01111111 for the (127th) ATM data cell and so on.

If each connection has a different value of N or several connections have differing values of N, a straight comparison of TUC modulo N/2 is not usually used. Instead a top one or more (i.e., M) number of significant bits are compared as follows:

| | TUC | Priority |
|---|---|---|
| Connection A | 111100 | 111 |
| Connection B | 01100100 | 011 |

Above, M=3 is used although any integer M may be used wherein M is the number of significant bits used as the priority.

The priority is set up as and queued as being M bits as discussed above wherein M<$\log_2$(N) or a plurality of topmost bits of the TUC. For example, the following table is presented:

| TUC decimal | TUC binary 76543210 | priority | |
|---|---|---|---|
| 0 | 00000000 | 000 | |
| 1 | 00000001 | 000 | |
| ... | | | |
| 7 | 00000111 | 000 | |
| 8 | 00001000 | 001 | |
| 9 | 00001001 | 001 | |
| ... | | | |
| 15 | 00001111 | 001 | |
| 16 | 00010000 | 010 | |
| 17 | 00010001 | 010 | |
| ... | | | |
| 23 | 00010111 | 010 | |
| 24 | 00011000 | 011 | |
| 25 | 00011001 | 011 | |
| ... | | | |
| 31 | 00011111 | 011 | |
| 32 | 00100000 | 100 | |
| 33 | 00100001 | 100 | |
| ... | | | |
| 39 | 00100111 | 100 | |
| 40 | 00101000 | 101 | |
| 41 | 00101001 | 101 | |
| ... | | | |
| 47 | 00101111 | 101 | |
| 48 | 00110000 | 110 | |
| 49 | 00110001 | 110 | |
| ... | | | |
| 55 | 00110111 | 110 | |
| 56 | 00111000 | 111 | |
| 57 | 00111001 | 111 | |
| ... | | | |
| 63 | 00111111 | 111 | |
| 64 | 01000000 | 000 | ATM violation |
| ... | | | |
| 128 | 01111111 | xxx | |

The table above shoes that the wrap around to zero may be used to indicate a violation has occurred.

The above table shows the decimal value of the TUC followed by the binary value of the TUC. In this mode counting of ATM data cells in the TUC starts at zero although counting may start at one or another number with some minor design changes as discussed above. The priority, when N is a power of 2, is a sub-set of the bits of the TUC. In the above table, a three bit priority is used although a one bit, two bit, four bit or any other size priority may be used as long as M is less than $\log_2$(N/2) in one form. In order to monitor for the N/2 violation state, the bits chosen for use in the priority begins with the $\log_2$(N)–2 bit (i.e. bit 5 in the TUC above) and progress down to any bit in a position less than the bit $\log_2$(N)–2 depending upon the size are resolution of precision which is desired. For example, if N=1024 then bit positions 8 through 6 are used to get a 3-bit priority wherein 0 is the least significant bit position (LSB position). If N=512, then bit positions 7 through 4 are used to get a 4-bit priority wherein 0 is the least significant bit position (LSB position). IF N=256, then bit positions 6 through 5 are used to get a 2-bit priority wherein 0 is the least significant bit position (LSB position), and so on.

Another, yet more complex priority, can also take into consideration the frequency of a plurality of last received user cells for a connection. Other priority schemes exist and may be used herein.

The invention can be further understood and discussed with reference to FIGS. 1–6. FIG. 1 illustrates in a timing diagram, the receipt of ATM data cells for a particular virtual path or virtual connection. Each spike in FIG. 1 indicates that an ATM data cell was received for a predetermined ATM virtual path and/or a predetermined ATM virtual connection.

There are typically more than one virtual path or virtual connection on one physical line and therefore more than one virtual path and more than one virtual connection are receiving data during periods when the predetermined ATM virtual path and/or the predetermined ATM virtual connection is not receiving data. In other words, the physical line time multiplexes between multiple paths and/or connections. FIG. 1 illustrates that at certain points in time (which may be periodic or non-periodic) one ATM path or connection received a plurality of serially provided ATM data cells.

FIG. 1 illustrates that performance monitoring is set to be reported once a number N of data cells is received. N is typically a power of 2 such as 64, 128, 256, 512, etc. as discussed above. Once N ATM data cells are received at a point in time labeled A in FIG. 1, a FMC identifier (i.e., a performance monitoring cell identifier or FMC ID) is queued in a data structure such as a queue, an array, or the like. At point in time A, the FMC ID which is queued is given a priority. An FMC corresponding to the FMC descriptor must be transmitted on the physical line for the N ATM cells in FIG. 1 before the transmission of N/2 ATM data cells which follow the point A. In other words, the FMC which corresponds to the FMC descriptor must be generated/created and sent before the point B in FIG. 1. If this transmission does not occur, an ATM performance monitoring fault occurs.

In FIG. 1, point C is similar to point A in that another N ATM data cells is received by the time point C is reached and an FMC descriptor or FMC ID needs to be queued once again. Since thousands of connections and paths may be active on a single ATM physical line, typically only a finite number (e.g., up to 60) paths or connections can be performance monitored at a single time. Due to that fact that tens or hundreds of connections and/or paths may be requiring performance monitoring, it is not unusual for several FMC descriptors to be queued at a time for different connections/paths. This makes the priority checking essential so that FMCs are sent in a timely manner to avoid ATM faults. Usually, an ATM processor can output cells faster than it receives cells since physical line communication is typically done at a slower speed (similar to comparing a modem communication speed to the internal bus of a personal computer). Therefore, there are gaps or holes in the transmission use of the output bus which is used to output ATM cells which are input via FIG. 1. These output gaps/holes are used by the ATM processor to send the FMCs without slowing the ATM data communication process.

Figure 2:
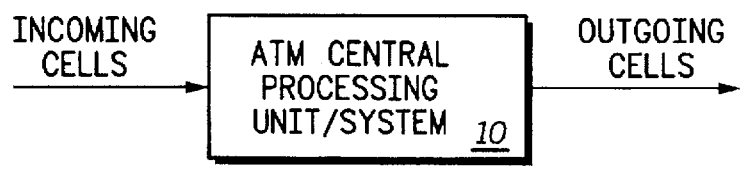
FIG. 2 illustrates, in a block diagram, an ATM system in accordance with the present invention.

In FIG. 2, a simple ATM central processing unit (CPU) or ATM processor is illustrated. In FIG. 2, incoming cells are received for one or more paths and/or connections as illustrated for one path/connection in FIG. 1. Once again, multiple paths/connections are received via time multiplexing ATM data cells on the incoming physical line in FIG. 2. The outgoing line of FIG. 2 is used to send out ATM data received by the incoming data line and is typically faster than the incoming data line so that the outgoing line has gaps or holes in transmission. These holes are used to insert the FMC (i.e., performance monitoring cell) into the outgoing cell stream.

Figure 3:
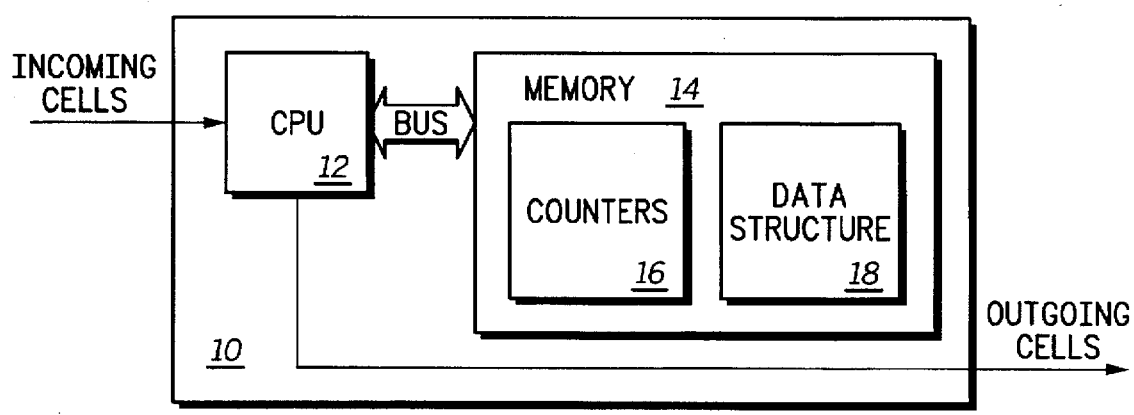
FIG. 3 illustrates, in a block diagram, more detailed illustration of FIG. 2.

FIG. 3 illustrates a more detailed block diagram of FIG. 2. The system 10 has a CPU 12 and a memory 14 coupled via a bus. The bus contains address and data information as well as optional control signals. The incoming and outgoing cell lines are illustrated in FIG. 2. Incoming cells are received and processed by the CPU 12. CPU 12 may or may not store ATM data received via an incoming cell to memory 14 but will always transfer/communicate correctly-received ATM data via the outgoing cell line. Once a connection or path is specified as being active in the ATM system 10, an option exists to have its performance monitored. If performance monitoring is desired for a predetermined connection/path, then a counter in counter area 16 is assigned to the predetermined connection/path and a number N is assigned/designated to the predetermined connection/path. The counter beings to count each cell received for the predetermined connection/path. Once this counter signifies that N ATM data cells were received for the predetermined connection/path, an FMC descriptor (or FMC ID) and a corresponding initial priority is queued or stored in the data structure 18.

The priority of the queued FMC for the predetermined connection/path is incremented in a manner discussed above in previous table until the queued FMC is chosen as having a highest priority in the data structure 18 (wherein data structure 18 may, and most likely will, contain other prioritized FMC IDs for other connections/paths). The priority is preferably a sub-set of the bits in the corresponding counter stored via counters 16 for the predetermined connection/path. The counter is continually counting new/additionally-received ATM data cells which come at a time after the queuing of the FMC ID. Once the FMC ID has a highest priority (from the increasing counter receiving more ATM data cells), the FMC ID is removed from the structure 18 and an FMC or performance monitoring cell is created for the corresponding (newly removed) FMC ID. The FMC is transmitted in a gap in the transmission of the outgoing line and is performed before N/2 cells are received after the transmission of the previous N cells. By using a portion of the counters as priority bits, faults are avoided by ensuring that FMCs are sent before N/2 subsequent cells are received.

Figure 4:
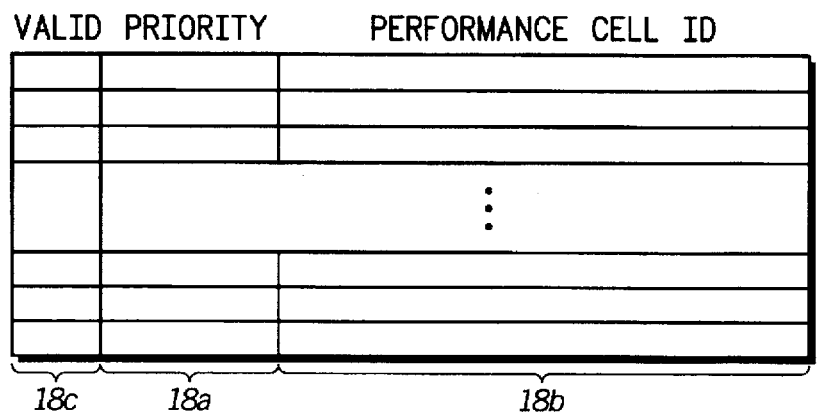
FIG. 4 illustrates, in a block diagram, more detailed illustration of the data structure of FIG. 3.

FIG. 4 illustrates in more detail the structure of data structure 18. In a preferred form, each entry in the structure 18 comprises a valid bit 18c, a priority field 18a, and the FMC descriptor or FMC ID 18b. Other information/fields may be added to or removed from the structure 18. For example, the valid bit may be removed by making one possible value of the priority an invalid entry identifier.

Figure 5:
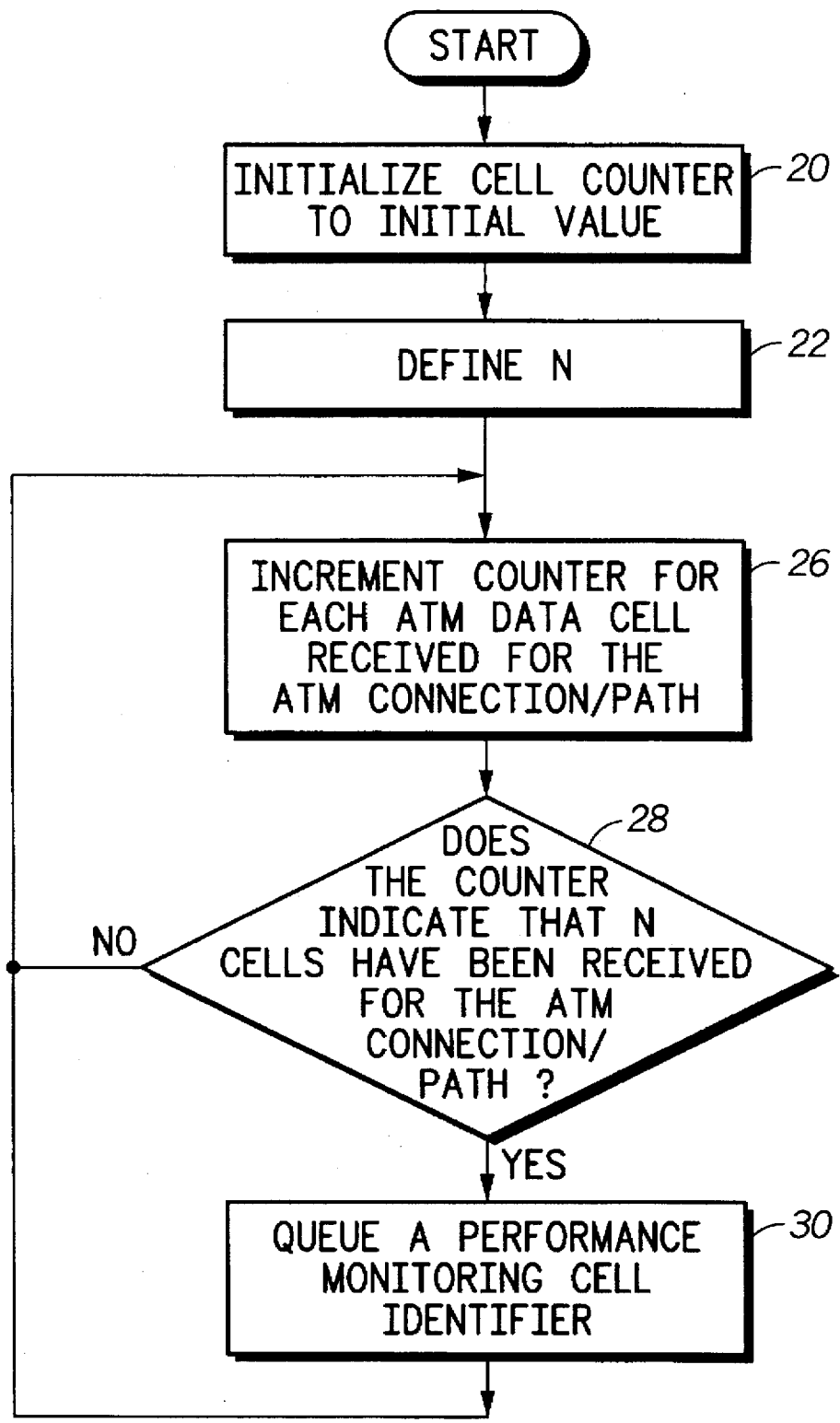
FIGS. 5-6 illustrate, in flowcharts, a method for queuing, prioritizing, creating, and transmitting ATM performance monitoring cells in accordance with the present invention.
Figure 6:
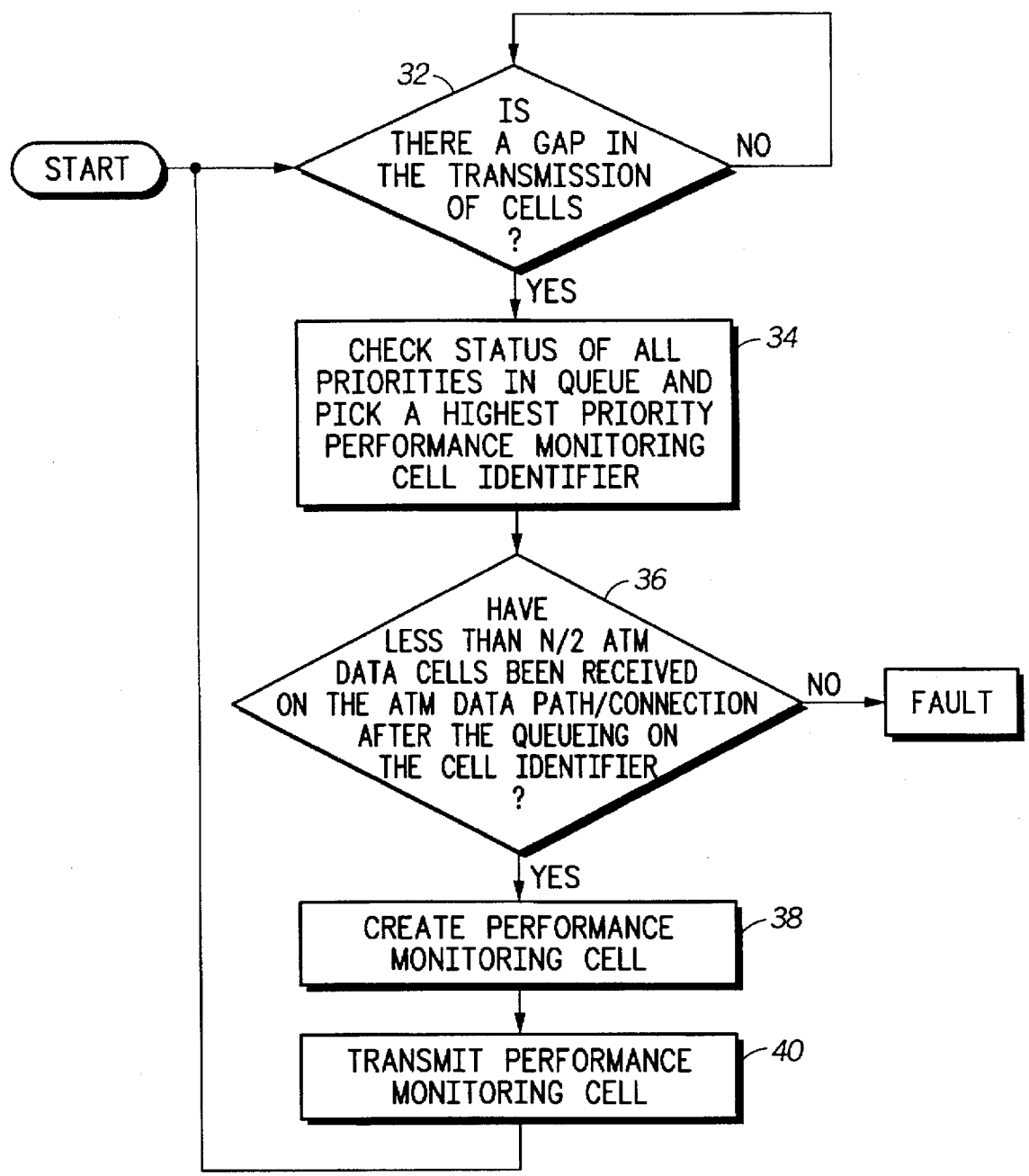

FIG. 5–6 each illustrate the above discussed processes in a flowchart form. FIG. 5 illustrates how the system 10 receives cells are determines when to queue an FMC descriptor and priority. FIG. 6 illustrates how the system 10 determines that a queued FMC descriptor should be output to the outgoing line and removed from the queue.

FIG. 5 illustrates a method used by the system 10 to queue an forward monitoring cell (FMC) for performance monitoring in an asynchronous transfer mode (ATM) system. FIG. 5 illustrates the process of monitoring a single connection or path in the ATM system. If more than one ATM connection or path is active in the ATM system then the method of FIG. 5 is performed for each connection/path.

In FIG. 5, a step 20 is used to initialize a counter to an initial value (usually zero, one, or a like starting digit) for an ATM connection/path. A step 22 defines or determines a number N (N is the block size, as taught herein) for the ATM connection/path. The steps 20 and 22 are usually only performed once but may be performed at other points in time for other tests. In a step 24, the beginning of a stream of ATM data cells is sent to the ATM system or ATM CPU. In a step 26, the counter is incremented for every ATM data cell received for the ATM connection/path with which the counter is associated. The ATM system continually checks the counter via a step 28 to determine if the number of total cells received for the ATM connection/path is equal to N (i.e., checks to see if the counter is equal to it's initial value modulo N). If the number of total cells received for the ATM connection/path is equal to N then step 30 is executed else the system continues to receive cells and increment the counter accordingly. In a step 30, the number of cells reached is equal to or greater than N and an FMC descriptor (i.e., FMC ID) is queued in a data structure with an initial priority. The counter can be optionally cleared after step 30 or, in a preferred form, the counter keeps incrementing and a modulo calculation is used to determine when N ATM data cells are received.

FIG. 6 illustrates that once a cell is queued as taught in FIG. 5, it is monitored and transmitted based on the priority which is kept. First, in a step 32, a gap is identified in the outgoing line wherein the gap may be used to send an FMC. Once the gap is identified, a step 34 checks all the status bits/fields in the data structure to determine a one FMC ID with a highest priority. In many cases, several FMC IDs will have an equal priority and many known algorithms (random, FIFO, LIFO, selection based on bandgap such as take the entry with the highest priority and highest bandgap) may be used to avoid starvation and efficiently determine the FMC ID to choose. In some cases, no FMC IDs will be queued because no monitoring is currently pending. In this cases, no FMC is output and the gap remains unused. Once an FMC ID is chosen for output, the FMC ID is either invalidated or removed from the data structure.

In FIG. 6, a step 36 checks to ensure that the N/2 rule discussed earlier is not violated and that the FMC transmission will occur before N/2 subsequent cells are received. If more than N/2 cells have been received, then a fault occurs. Usually, due to the fact that a small amount of connections/paths are monitored for performance (usually less than 100 connections/paths are monitored out of potentially millions of connections/paths), a fault never occurs since gaps occur frequent enough in the outgoing line to avoid faults even at high bandwidths. If no fault occurs, an FMC cell corresponding to the FMC ID is formed/created in a step 38. In a step 40, the FMC is transmitted on the outgoing line.

While the present invention has been illustrated and described with reference to specific embodiments, further modifications and improvements will occur to those skilled in the art. For example, counters are taught herein and incrementing is usually associated with a counter herein. In other forms, state machines, ring counters, decrementors, step counters, and/or the like can be used instead of an incrementing counter to keep track of ATM data cell transmissions. Keeping track of data cells need not always be performed via linear incrementing but could be another structure for keeping a count. It is important to note that a plurality, as used herein, is intended to mean any number of elements which is more than one ranging from two to theoretically infinite elements. The term plurality should not be Limited to any particular constant or sub-range within the range of two through infinity. As used herein, "data paths" can mean one or more virtual paths, one or more virtual connections or a combination of one or more virtual paths and connections on one or more physical lines. The techniques taught herein may also be used for other types of monitoring in an ATM systems such as backward monitoring. Above, the stated rule was that an FMC cell must be transmitted before N/2 subsequent cells are received. In other forms, (usually depending upon whether end-to-end monitoring is being performed or segment connection monitoring is being performed) the FMC cell must be transmitted before N subsequent cells are received. Therefore, the block size specified for FMC cell transmission may be altered. It is to be understood, therefore, that this invention is not limited to the particular forms illustrated and that it is intended in the appended claims to cover all modifications that do not depart from the spirit and scope of this invention.

What is claimed is:

1. A method for transmitting a performance monitoring cell in an asynchronous transfer mode (ATM) system, the method comprising the steps of:

(a) initializing a cell counter to a starting value;
    (b) defining a number N where N is a finite positive integer, N being a number of ATM cells which are to be performance monitored as a group;
    (c) receiving N ATM data cells wherein the cell counter is incremented for each of the N ATM data cells received until the cell counter is set to an ending value;
    (d) storing a performance monitoring cell identifier in a data structure in response to the cell counter being set to the ending value;
    (e) assigning a priority to the performance monitoring cell identifier which is stored;
    (f) altering the priority to at least one other priority as time progresses;
    (g) creating and transmitting the performance monitoring cell which corresponds to the performance monitoring cell identifier, the creating and transmitting being performed in response to the priority of the performance monitoring cell identifier.

2. The method of claim 1 wherein the step of altering the priority comprises:

setting the priority as a sub-set of bits from the cell counter wherein priority is changed in response to a change in the sub-set of bits in the cell counter.

3. The method of claim 1 wherein the step of creating and transmitting comprises:

creating and transmitting the performance monitoring cell which corresponds to a performance monitoring cell identifier which has a highest priority in the data structure.

4. The method of claim 1 wherein the steps (a) through (g) are performed for each data path in a plurality of data paths defined within the ATM system.

5. The method of claim 1 wherein a data path is a structure selected from a group consisting of: a virtual path, a virtual connection, a plurality of virtual paths, a plurality of virtual connections, a physical line.

6. The method of claim 1 wherein the step of creating and transmitting comprises:

creating and transmitting the performance monitoring cell for a predetermined virtual connection before the receipt of N/2 subsequent ATM data cells which are received after step (c) for the predetermined virtual connection.

7. The method of claim 1 wherein the step of creating and transmitting comprises:

creating and transmitting the performance monitoring cell for a predetermined virtual path before the receipt of N/2 subsequent ATM data cells which are received after step (c) for the predetermined virtual path.

8. The method of claim 1 wherein the ending value is power of two selected from the group consisting of: 64, 128, 256, 512, 1024, and 2048.

9. The method of claim 1 wherein the step (a) comprises:

initializing the counter to a starting value selected from the group consisting of: one and zero.

10. A method for prioritizing monitoring cells for transmission in an asynchronous transfer mode (ATM) system, the method comprising the steps of:

receiving a plurality of ATM data cells from a physical communication line, the plurality of ATM data cells corresponding to a plurality of data paths in the ATM system;

assigning a number N to each of the data paths in the plurality of data paths wherein each N is a finite integer and each N can be a different value for each of the data paths in the plurality of data paths;

providing a plurality of counters wherein each counter is associated with a unique one data path in the plurality of data paths;

determining which ATM data cells correspond to each data path in the plurality of data paths, each receipt of an ATM data cell altering the counter associated with the data path which received the ATM data cell to record the receipt of the ATM data cell;

monitoring each counter to determine if any counter has reached a value which indicates that N ATM data cells were received for any unique one data path;

generating a performance monitoring descriptor and an initial priority for each unique one data path which has received N ATM data cells each time N ATM data cells are received by each unique one data path;

storing the performance monitoring descriptor and an initial priority in a data structure wherein the data structure is designed to contain one or more performance monitoring descriptors and a corresponding priority;

altering the priority of the performance monitoring descriptors which are stored in the data structure as time passes and as more ATM data cells are received;

generating a performance monitoring ATM cell in response to an increasing priority of one performance monitoring descriptor in the data structure which corresponds to a high priority data path; and transmitting the performance monitoring ATM cell before for the high priority data path before N/2 subsequent ATM data cells are received by the high priority data path.

11. The method of claim 10 wherein the step of altering the priority comprises:

storing each priority as a sub-set of bits from one unique counter in the plurality of counters; and updating the priority as the sub-set of bits change.

12. A method for transmitting performance monitoring cells which are used to monitor a communication system, the method comprising the steps of:

(a) defining an integer N;

(b) receiving a first plurality of data cells via a communication line, the first plurality of data cells being counted as the data cells are received;

(c) determining when a number of data cells which are received is equal to N thereby resulting in a group of N received data cells;

(d) storing that a performance monitoring cell needs to be sent in response to the receipt of N received data cells and assigning a priority to the performance monitoring cell;

(e) continuing to receive N/2 subsequent data cells after receipt of the N received data cells wherein the N/2 subsequent data cells are a portion of a second plurality of data cells, the N/2 subsequent data cells being received via the communication line; and (f) transmitting the performance monitoring cell which corresponds to the first plurality of data cells at some time during receipt of the N/2 subsequent data cells, the transmitting of the performance monitoring cell being performed via the communication line, the priority of the performance monitoring cell being increased as time progresses from the step (d) to a point in time when all the N/2 subsequent data cells are received.

13. The method of claim 12 wherein the step (d) comprises:

storing a performance monitoring cell identifier to identify a performance monitoring cell which is to be created at a later time.

14. The method of claim 12 wherein the step (f) comprises:

creating the performance monitoring cell in response to accessing a performance monitoring cell identifier which is stored in step (d).

15. The method of claim 12 wherein the steps (b) through (0 are repeated for each set of N data cells within a plurality of sets of N data cells wherein the sets are received in a serial manner one after another for an ATM data path.

16. The method of claim 12 wherein the step (b) comprises storing in a counter a number of data cells which are being received and wherein step (f) comprises:

altering the priority in response to a change in the counter.

17. The method of claim 16 wherein the step of altering the priority in response to a change in the counter comprises:

storing a portion of the counter as the priority.

18. The method of claim 16 wherein the step of altering the priority in response to a change in the counter comprises:

clearing the priority in response to the step (f) being performed.

19. A structure for allowing prioritization of performance monitoring cells in an asynchronous transfer mode (ATM) system, the structure comprising:

a physical conductor having a plurality of virtual connections formed therethrough;

a plurality of counters wherein each counter in the plurality of counters is associated with a unique one virtual connection in the plurality of virtual connections, each counter counting a number of ATM data cells which are received for a corresponding virtual connection;

a data structure wherein a plurality of performance monitoring cell identifiers are stored with each performance monitoring cell identifier having a priority, the data structure accepting new performance monitoring cell identifiers in response to counters attaining a predetermined value; and control circuitry for updating and monitoring the priority of the performance monitoring cell identifiers in the data structure and providing a highest priority performance monitoring cell identifier as output.

20. The structure of claim 19 wherein the control circuitry sends a signal which allows a performance monitoring cell to be created and transmitted in response to the highest priority performance monitoring cell identifier.

21. The structure of claim 19 wherein each priority comprises a portion of a unique one counter in the plurality of counters.

22. A structure for allowing prioritization of performance monitoring cells in an asynchronous transfer mode (ATM) system, the structure comprising:

a central processing unit (CPU) for controlling communication in the ATM system; and a memory comprising a data structure, the data structure having a plurality of entries wherein each entry stores a priority and a performance monitoring identifier, the priority of each entry being updated periodically and being used to determine which performance monitoring identifier has a highest priority and determining which performance monitoring cell should be transmitted through the ATM system in a next available time period.

* * * * *

UNITED STATES PATENT AND TRADEMARK OFFICE
CERTIFICATE OF CORRECTION

PATENT NO. : 5,717,858
DATED : February 10, 1998
INVENTOR(S) : Ronen Shtayer, et. al.

It is certified that error appears in the above-identified patent and that said Letters Patent is hereby corrected as shown below:

In claim 15, column 10, line 19;
    replace "(0", with - -(f)- -.

Signed and Sealed this

Seventeenth Day of November, 1998

Attest:

BRUCE LEHMAN

*Attesting Officer*      *Commissioner of Patents and Trademarks*